United States Patent [19]

Shiomi et al.

[11] Patent Number: 5,217,825
[45] Date of Patent: Jun. 8, 1993

[54] SEALED LEAD-ACID BATTERY

[75] Inventors: Masaaki Shiomi; Kenzi Nakamura, both of Kyoto, Japan

[73] Assignee: Japan Storage Battery Co., Ltd., Kyoto, Japan

[21] Appl. No.: 779,247

[22] Filed: Oct. 18, 1991

[30] Foreign Application Priority Data

Oct. 18, 1990 [JP] Japan ............................... 2-281396
Nov. 9, 1990 [JP] Japan ............................... 2-305595

[51] Int. Cl.$^5$ ............................................ H01M 2/18
[52] U.S. Cl. ................................. 429/140; 429/238
[58] Field of Search ............................... 429/140, 238

[56] References Cited

U.S. PATENT DOCUMENTS

| | | | |
|---|---|---|---|
| 2,882,330 | 4/1959 | Garten | 429/140 |
| 3,014,975 | 12/1961 | Gumprecht et al. | 429/140 |
| 3,194,684 | 7/1965 | Wells | 429/140 |
| 4,366,214 | 12/1982 | Lindholm | 429/140 |

Primary Examiner—Stephen Kalafut
Attorney, Agent, or Firm—Sughrue, Mion, Zinn, Macpeak & Seas

[57] ABSTRACT

An improved tubular sealed lead-acid battery is proposed which has superior cycle life performance by providing a gap A between adjacent tubes which gap is expressed by the following equation, in which constant X is within the range of 0.29–0.75:

$$A = B \times \text{constant } X \times (1.1 - 0.1 \times E) - 2 \times C \times D$$

where
A: the gap between the tubes (mm)
B: the inside radius of the tube (mm)
C: the thickness of the tube (mm)
D: the porosity of the tube (%)×0.01
E: the inter-electrode distance (mm).

3 Claims, 6 Drawing Sheets

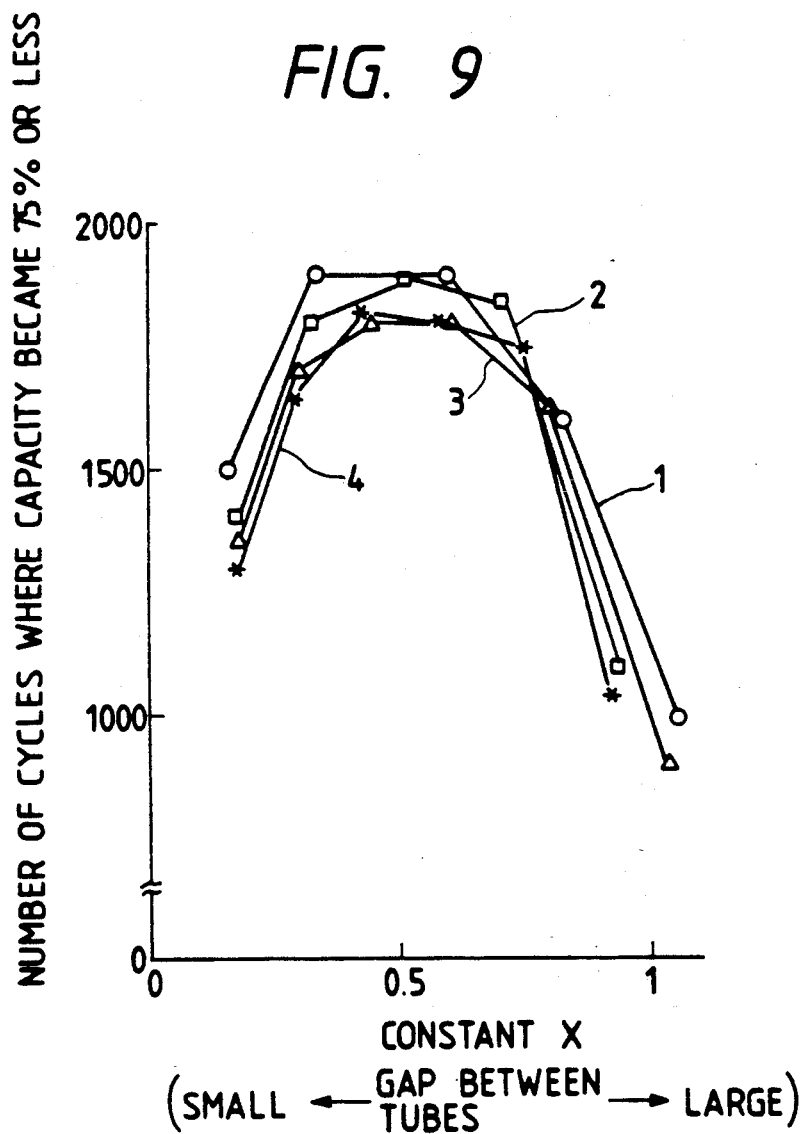

SEALED LEAD-ACID BATTERY

BACKGROUND OF THE INVENTION

This invention relates to an improvement of sealed lead-acid batteries one objective of which is to provide a sealed lead-acid battery having good life performance.

When a conventional open flooded-type cell is used for fork lifts and in other applications where deep discharge is performed cyclically, it is common practice to use tubular positive plates having the positive active material enclosed within a tube made of either glass or synthetic resin fibers. Upon discharge of a positive plate, $PbO_2$ as the active material is usually converted to $PbSO_4$ of a larger volume, so that the shape and the volume of the positive plate will change greatly as the number of discharge cycles increases. Hence, if deep discharge is performed cyclically, the binding strength of the positive active material will decrease, causing a gradual decrease in the discharge capacity. Tubular positive plates having the positive active material enclosed within a tube are capable of suppressing the expansion and dislodging of the active material, so they are known to have a long cycle life with the binding strength of the active material being maintained for an extended period. For these reasons, tubular positive plates are also used in the art to manufacture sealed lead-acid batteries having good cycle life performance.

The following three methods are generally known to be applicable for sealing cells:

(1) an electrolyte is impregnated and retained in the plates and separators that are made of fine glass fibers and that conform to the shape of positive and negative plates to fabricate a "retainer type" cell;

(2) an electrolyte is gelled with colloidal silica or the like to fabricate a "gel-type" cell; and (3) silica granules are packed between plates and around a plate group consisting of the plates and a separator, and an electrolyte is impregnated and retained in the plates, separators and the silica granules to fabricate a "granulated silica retainer type" cell.

Method (1) has not been commercialized since the cost of preparing separators is very high. Compared to flooded-type cells, the cells fabricated by methods (1)–(3) have lower discharge capacities and their life performance is also considerably low. Further, these cells experience greater deterioration in performance than cells employing pasted plates, the inherent advantages of using tubular plates yet being not fully exploited.

In order to investigate the reasons for these problems, the present inventors have conducted various experiments on gel-type and granular type cells and found the following.

In sealed lead-acid batteries of the types described above, most of the electrolyte is retained in the gel or granular silica. However, the transport speed of $H_2SO_4$ through those retainers is much slower than in flooded-type cells, so $H_2SO_4$ in the electrolyte will be transported into the active material at a much slower speed than in flooded-type cells. As a result, when sealed cells that use tubular positive plates are discharged, $H_2SO_4$ is consumed mainly in the neighborhood of a tubular positive plate, and the following phenomena occur within the cells.

In sealed cells that use tubular plates, only a very small amount of electrolyte is present near the contact areas of two adjacent tubes as can be seen from FIG. 2 which shows, in cross section, the essential components of a conventional sealed lead-acid battery including a tubular positive plate 1, posted negative plate 2, separator 3, gelled electrolyte 4, table 5, lead spine 6 and positive active material 7. As a result, the active material at the contact areas of adjacent tubes is supplied with only a small amount of electrolyte, the discharged capacity therefore being reduced. FIG. 3B shows, diagrammatically, $PbSO_4$ distribution in the cross-sectional positive plate for the case described above. Clearly, $PbSO_4$ which is a discharge product, is distributed unevenly across the thickness of the positive plate. FIGS. 3A–3C show the profiles of distribution of $PbSO_4$ after discharging the tubular positive plate. FIG. 3A refers to the cell of the present invention; while FIGS. 3B and 3C refer to conventional sealed and flooded-type cells, respectively.

In the flooded-type cell (FIG. 3C), $H_2SO_4$ in the electrolyte moves very quickly. As a result, the areas of contact between tubes are replenished with $H_2SO_4$ from other areas as soon as it is consumed, such that the discharge of the positive plate will proceed uniformly in a substantially concentric manner as shown in FIG. 3C.

The above results show that the discharge capacity of the sealed cell is much smaller than in the flooded-type because the transport speed of $H_2SO_4$ is slow. Also, the use of tubular plates results in a greater drop in capacity compared to the flooded-type because discharge of tubular positive plate is less likely to occur in areas of contact between tubes. Consequently, in the sealed cell, current density will localized in an area where discharge is highly likely to occur, the active material therein deteriorating prematurely so as to shorten the life of the cell.

SUMMARY OF THE INVENTION

An object of the present invention is to improve the cycle life performance of a tubular sealed lead-acid battery. The present invention attains this object by retaining electrolytes in a gap provided between tubes of tubular positive plates, the gap being expressed by the following equation which is a function of the diameter, thickness and porosity of each tube and the inter-electrode distance:

$$A = B \times \text{constant } X \times (1.1 - 0.1 \times E) - 2 \times C \times D$$

where
A: the gap between tubes (mm)
B: the inside radius of tube (mm)
C: the thickness of a tube (mm)
D: the porosity of a tube (%) $\times 0.01$
E: the inter-electrode distance (mm)
X 0.29–0.75 (see FIG. 1).

By employing a gap of suitable dimensions, the tubular positive plate in a gel-type or granulated silica retainer type will be uniformly discharged as shown in FIG. 3A. As a result, the effective current density will become lower than in conventional apparatus thereby reducing the deterioration of the active material and improving the cycle life performance of the cell.

In practice, however, in order to provide a gap between tubes within the same space, the number of tubes has to be made smaller than in the conventional art and the amount of active material that can be used decreases accordingly. Hence, the gap to be provided between tubes must be limited to a certain size. Providing a gap between tubes is equivalent to insuring a greater amount of electrolyte in the neighborhood of the positive active material and the same result can be attained by changing the parameters of the tube such as its diameter, thickness and porosity. If those parameters are changed, the gap parameters also are seen to vary. Further, if the distance between electrodes is changed, the manner in which the electrolyte is supplied to the active material will change, which would also cause a change in the size of the gap between tubes.

BRIEF DESCRIPTION OF THE DRAWINGS

FIG. 9 is a characteristic graph for the life performance of the granulated silica retainer type fabricated in Example 2 having an inter-electrode distance of 1.0 mm;

DETAILED DESCRIPTION OF THE PREFERRED EMBODIMENTS

Figure 2:
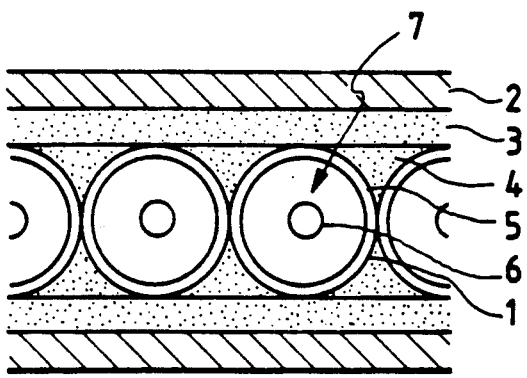
FIG. 2 is a diagrammatic cross-sectional view showing the essential parts of a conventional sealed lead-acid battery.
Figure 3A:
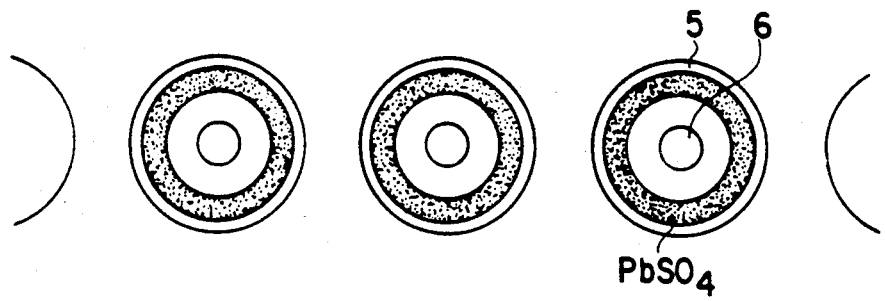
FIG. 3A shows a profile of the $PbSO_4$ distribution after discharging a tubular positive plate of a cell according to the present invention.
Figure 3B:
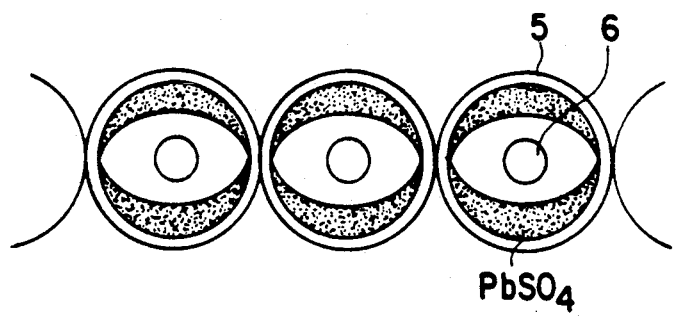
FIG. 3B shows a profile of the $PbSO_4$ distribution after discharging a tubular positive plate of a conventional sealed cell.
Figure 3C:
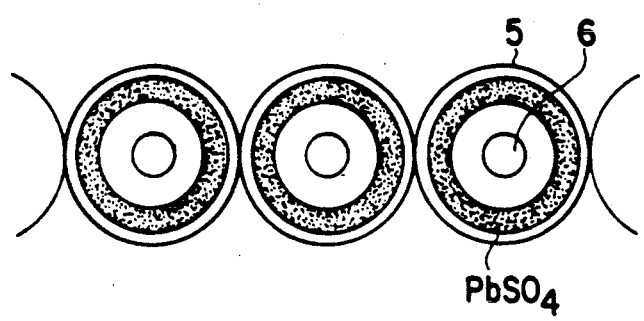
FIG. 3C shows a profile of the $PbSO_4$ distribution after discharging a tubular positive plate of a conventional flooded-type cell.

The preferred embodiments of the cell of the present invention will be described below with reference to FIGS. 1 and 4-10. Parts identified by reference numerals 1-6 in FIGS. 2, 3B and 3C are intended to correspond with parts identified by identical reference numerals 1-6 in FIGS. 1 and 3A.

EXAMPLE 1

Figure 1:
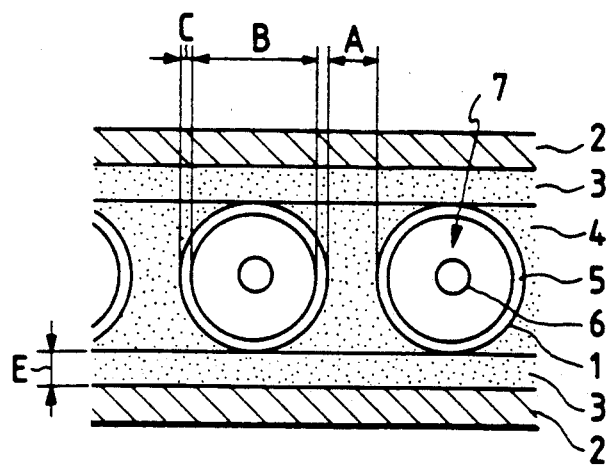
FIG. 1 is a diagrammatic cross-sectional view showing the essential parts of the sealed lead-acid battery of the present invention.

FIG. 1 is a diagrammatic cross-sectional view showing the essential part of the sealed lead-acid battery of the present invention. As shown, the battery comprises a tubular positive plate 1, pasted negative plate 2, separator 3, a gelled electrolyte 4, tube 5, lead spine 6 and positive active material 7.

Using lead spines made of a Pb-Ca-Sn alloy and glass tubes having a porosity of 70%, samples of positive plates having the dimensions shown in Table 1 below were prepared. Two units of each positive plate sample, three units of the conventional pasted negative plate and pulp separators were assembled to make two cell samples, one having an inter-electrode distance of 1.0 mm and the other having an inter-electrode distance of 3.0 mm. After filling an electrolyte made of a mixture of dilute sulfuric acid and a gelling agent, the cells were charged for a predetermined capacity until their specific gravity was 1.30 (20° C.). A safety valve and other necessary components were fitted in the usual manner to fabricate cells having a capacity of about 65 Ah(5HR).

TABLE 1

| Positive plate | Tube parameters | | | | Remarks |
| | inside diameter (mm) | thickness (mm) | gap (mm) | number | |
| --- | --- | --- | --- | --- | --- |
| 1-A | 11 | 0.5 | 0.2 | 12 | prior art |
| 1-B | 11 | 0.5 | 1.2 | 11 | invention |
| 1-C | 11 | 0.5 | 2.7 | 10 | invention |
| 1-D | 11 | 0.5 | 3.9 | 9 | |
| 1-E | 11 | 0.5 | 5.6 | 8 | |
| 2-A | 9 | 0.45 | 0.2 | 15 | prior art |
| 2-B | 9 | 0.45 | 0.9 | 14 | invention |
| 2-C | 9 | 0.45 | 1.7 | 13 | invention |
| 2-D | 9 | 0.45 | 2.6 | 12 | invention |
| 2-E | 9 | 0.45 | 3.6 | 11 | |
| 3-A | 8 | 0.4 | 0.1 | 17 | prior art |
| 3-B | 8 | 0.4 | 0.7 | 16 | invention |
| 3-C | 8 | 0.4 | 1.3 | 15 | invention |
| 3-D | 8 | 0.4 | 1.9 | 14 | invention |
| 3-E | 8 | 0.4 | 2.7 | 13 | |
| 3-F | 8 | 0.4 | 3.6 | 12 | |
| 4-A | 7 | 0.3 | 0.2 | 19 | prior art |
| 4-B | 7 | 0.3 | 0.6 | 18 | invention |
| 4-C | 7 | 0.3 | 1.1 | 17 | invention |
| 4-D | 7 | 0.3 | 1.6 | 16 | invention |
| 4-E | 7 | 0.3 | 2.2 | 15 | |
| 4-F | 7 | 0.3 | 2.8 | 14 | |

Figure 4:
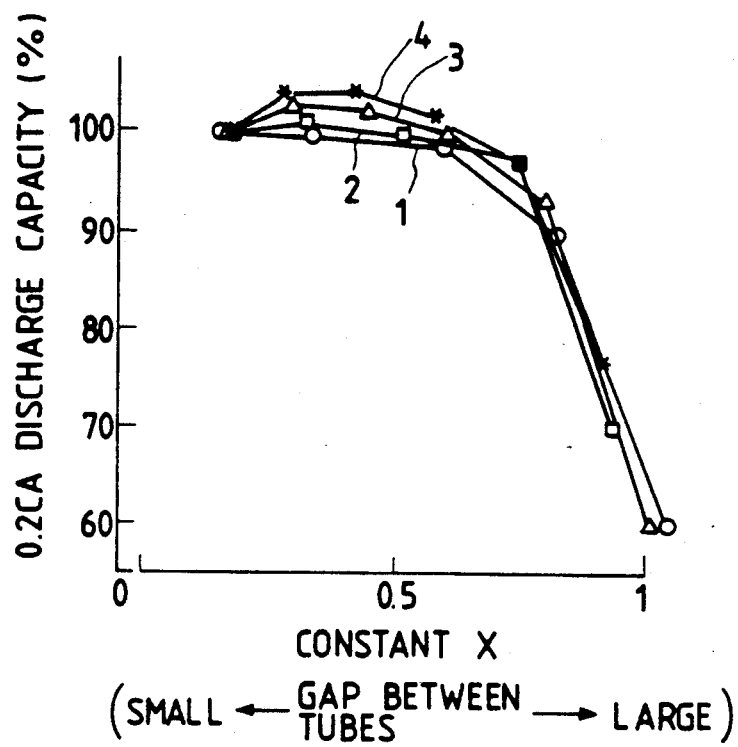
FIG. 4 is a characteristic graph for the discharge capacity of the gel-type cells fabricated in Example 1 having an inter-electrode distance of 1.0 mm.
Figure 5:
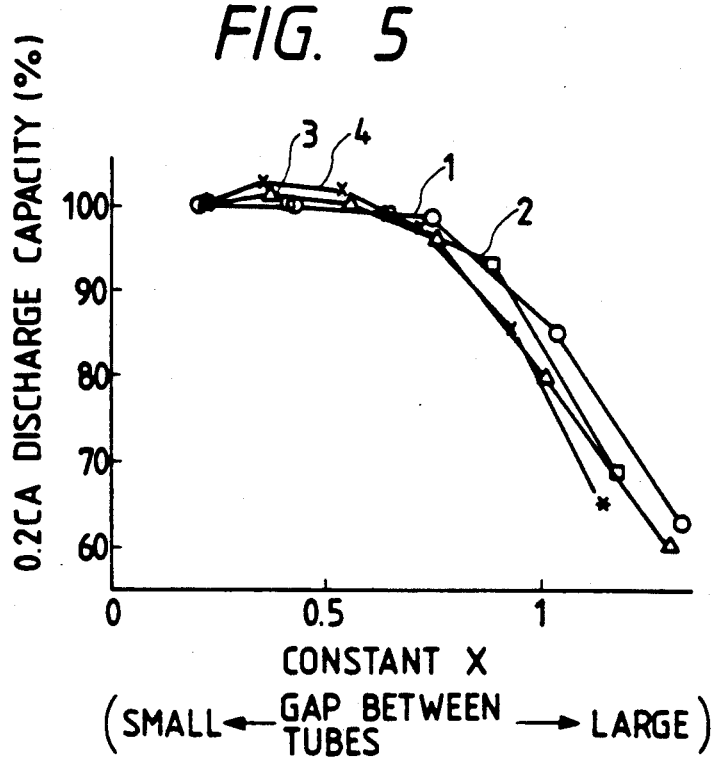
FIG. 5 is characteristic graph for the discharge capacity of the gel-type cells fabricated in Example 1 having an inter-electrode distance of 3.0 mm.

The cells using the positive plates characterized in Table 1 were discharged at 13 A to investigate their discharge capacity. The results are shown in FIG. 4 (inter-electrode distance E=1.0 mm) and FIG. 5 (inter-electrode distance E=3.0 mm). Irrespective of the inter electrode distance of 1 mm or 3 mm, the discharge capacity of the cells was substantially the same as in the prior art when a gap was provided between tubes, with constant X not exceeding 0.75. It was therefore clear that by at least satisfying the condition of $X \leq 0.75$ for the inter-tube gap, the drop in discharge capacity could be prevented even when the number of tubes used was smaller than in the prior art.

Figure 6:
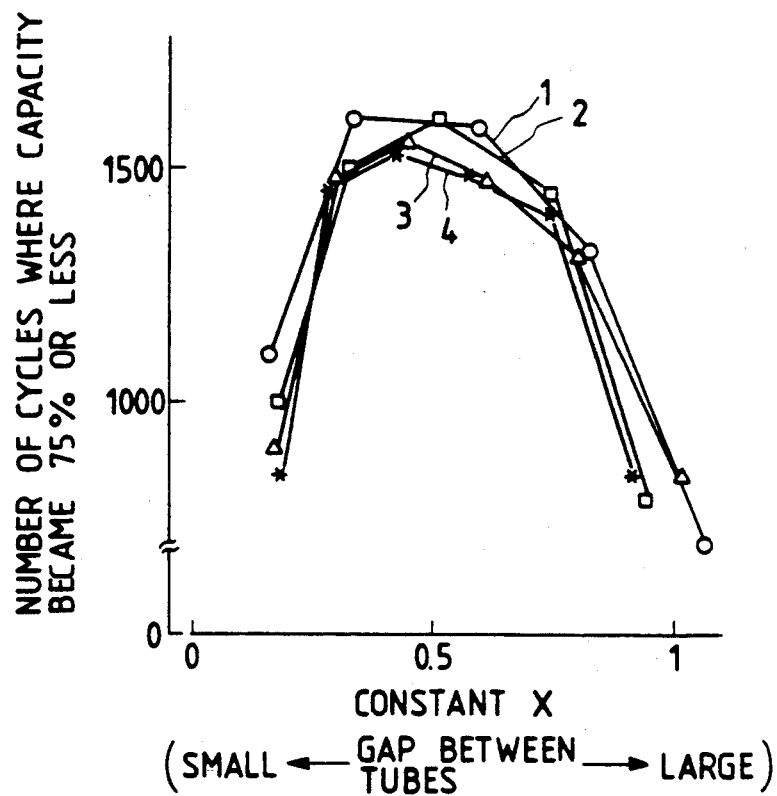
FIG. 6 is a characteristic graph for the life performance of the gel-type cells fabricated in Example 1 having an inter-electrode distance of 1.0 mm.
Figure 7:
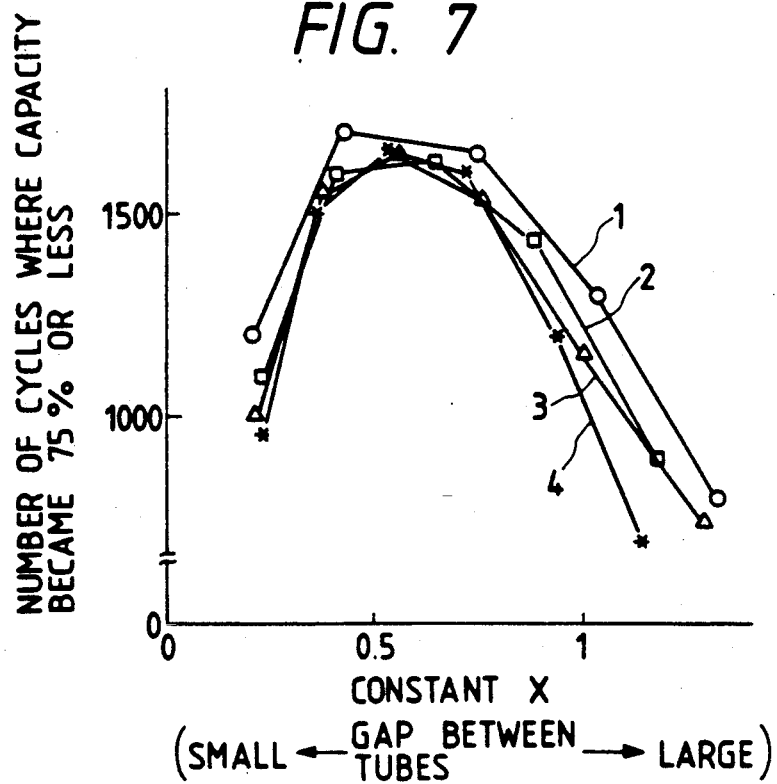
FIG. 7 is a characteristic graph for the life performance of the gel-type cells fabricated in Example 1 having an inter-electrode distance of 3.0 mm.
Figure 8:
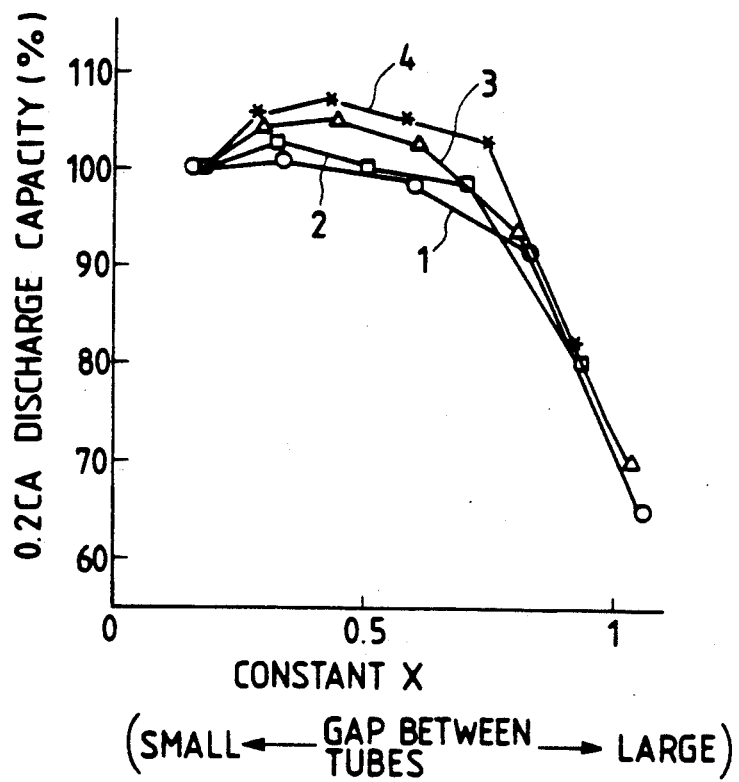
FIG. 8 is a characteristic graph for the discharge capacity of the granulated silica retainer type fabricated in Example 2 having an inter-electrode distance of 1.0 mm.

The cell samples were subjected to a cycle life test at 50° C. in which each cycle consisted of discharge at 20 A×2.5 h (DOD 77%) and charge at 20 A×90% and 6 A×25% (for a total of 110%). The results are shown in FIG. 6 (E=1.0 mm) and FIG. 7 (E=3.0 mm). The samples in which X was within the range of 0.29-0.75 specified by the present invention had a much better life performance than the prior art samples. This is probably because in the presence of a gap between tubes, the localization of the discharge reaction in a limited area could be prevented as shown in FIG. 3A, whereby the deterioration of the active material was retarded. The life performance was poor when X exceeded 0.75 and this is probably because the amount of active material was so small that the depth of discharge was excessive.

EXAMPLE 2

Samples of "granulated silica retainer type" were fabricated using the same layout as in Example 1 except that silica granules of 50–200 μm were packed between the plates and around the plate group. The discharge capacity of the cells having an inter-electrode distance of 1 mm is plotted in FIG. 8 and the life performance of the same cells is plotted in FIG. 9. As in Example 1, the cycle life performance was improved while the discharge capacity was substantially the same as in the prior art when a gap was provided between tubes in such a way as to satisfy the condition of X=0.29–0.75. Even in the case of E=3 mm, the life performance of the cells satisfying the condition of X=0.29–0.75 was improved (data not shown).

Figure 10:
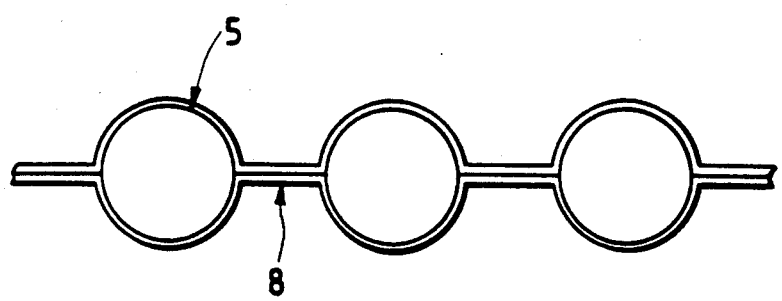
FIG. 10 shows diagrammatically a geometry of tubes to be used in the sealed lead-acid battery of the present invention.

In order to provide a constant gap between tubes, for example, two porous sheets may be sewn together or heat-sealed or vibration-sealed at intervals corresponding to the pitch of tubes to make "chained" tubes in which individual tubes 5 are linked by connectors 8, and the sewing or heat-sealed or vibration-sealing of the porous sheets are performed in such a way that the gaps (connectors 8) between tubes are spaced apart by a constant interval as shown in FIG. 10, where the shape of the tube is shown.

As described above, the tubular sealed lead acid battery of the present invention has cycle life performance that in significantly improved over the conventional types and, hence, the battery will offer great industrial benefits.

What is claimed is:

1. A sealed lead-acid battery comprising tubular positive plates, pasted negative plates and an electrolyte, wherein a gap is provided between adjacent tubes of said positive plates such that it is expressed by the following equation, in which constant X is within the range of 0.29–0.75:

$$A = B \times \text{constant } X \times (1.1 - 0.1 \times E) - 2 \times C \times D$$

where
A: the gap between the tubes (mm)
B: the inside radius of the tube (mm)
C: the thickness of the tube (mm)
D: the porosity of the tube (%)×0.01
E: the inter-electrode distance (mm).

2. A sealed lead-acid battery as claimed in claim 1, wherein said electrolyte is made of dilute sulfuric acid gelled with fine silica powder.

3. A sealed lead-acid battery as claimed in claim 1, wherein said electrolyte is impregnated and retained in said plates, a separator and silica granules which are packed between said plates and around a plate group.

* * * * *